(12) United States Patent  (10) Patent No.: US 7,086,193 B1
Hurst  (45) Date of Patent: Aug. 8, 2006

(54) DEER DECOY WITH DETACHABLE MOVABLE HEAD

(76) Inventor: Christopher M. Hurst, 8070 Lementon Rd., Freeburg, IL (US) 62243

( * ) Notice: Subject to any disclaimer, the term of this patent is extended or adjusted under 35 U.S.C. 154(b) by 0 days.

(21) Appl. No.: 11/221,080

(22) Filed: Sep. 8, 2005

(51) Int. Cl.
*A01M 31/06* (2006.01)
(52) U.S. Cl. ............................................................ 43/2
(58) Field of Classification Search .................. 43/2, 43/3, 1; 446/226; A01M 31/06
See application file for complete search history.

(56) References Cited

U.S. PATENT DOCUMENTS

| | | | |
|---|---|---|---|
| 4,773,178 A * | 9/1988 | Marek ................................ | 43/2 |
| 5,555,664 A * | 9/1996 | Shockley ........................... | 43/1 |
| 5,791,081 A * | 8/1998 | Turner et al. ...................... | 43/2 |
| 6,532,693 B1 * | 3/2003 | Sides ................................ | 43/2 |
| 6,550,773 B1 * | 4/2003 | McKenzie et al. ............ | 273/403 |
| 6,634,132 B1 * | 10/2003 | Lorenz ............................. | 43/2 |
| 6,901,693 B1 * | 6/2005 | Crowe .............................. | 43/2 |
| 2003/0093169 A1 * | 5/2003 | Gardner et al. ................ | 700/94 |
| 2003/0145506 A1 * | 8/2003 | Lorenz ............................. | 43/2 |

* cited by examiner

*Primary Examiner*—Peter M. Poon
*Assistant Examiner*—John D. Holman
(74) *Attorney, Agent, or Firm*—Haverstock, Garrett & Roberts LLP (57) ABSTRACT

A highly portable, motorized deer decoy uses a head motor to rotate the head of the decoy approximately 125 degrees, simulating the movement of the head of a live deer. The head and front torso of the deer decoy each have plates attached. The head plate can be attached or removed from a middle plate. The head motor is attached to the lower plate and rotates the middle plate. The head portion and legs of the deer decoy may be completely detached from the body. The detachability of the head and legs provides a compact and highly mobile deer decoy that may be readily transported, assembled and operated. The decoy also has another bleat motor that enables the hunter to simulate the bleating of a deer in the woods. The movement of the deer's head and the operation of the bleating device may be remotely controlled by a hand-held remotely controlled signaling device.

2 Claims, 7 Drawing Sheets

DEER DECOY WITH DETACHABLE MOVABLE HEAD

BACKGROUND OF THE INVENTION

This invention relates to the field of hunting. More particularly, a deer decoy with a detachable and movable head is presented. The deer decoy is motorized such that the head swivels from 1 degree to approximately 125 degrees to simulate the actual movement of a deer's head.

In the hunting field, decoys are often used to lure the prey towards a specific area. Some examples of the decoys used in the 1800's include hand-carved duck decoys. Duck decoys and other types of animal attracting decoys have been in common use throughout the United States and the world.

In recent years, deer decoys have been utilized to attract deer to a particular point while hunting. One example of such a deer decoy system is found in the 2000 patent issued to Sides, U.S. Pat. No. 6,532,693. The Sides decoy system includes an inflatable decoy mounted on a rod system. An additional feature of the Sides deer decoy system includes a motor and a movable tail section. One advantage of the Sides invention is that it is highly portable since it is inflatable. A disadvantage of the Sides System is that only the tail movement can be affected.

A more cumbersome, yet more advanced, deer decoy system is disclosed in the 2005 U.S. patent issued to Crowe. The Crowe patent, U.S. Pat. No. 6,901,693, is for a motorized game decoy. The Crowe patent can simulate movement of the entire deer body, movement of only the head and neck portion, movement of the ears, tail or legs, or a combination of the above. Crowe has the advantage of having a multi-movement deer decoy. One drawback of the Crowe patent is that it is difficult to transport since it is bulky and heavy, since it may include three or more motors. While Crowe has some parts that are detachable, it is generally bulky and difficult to haul through the woods during a hunting expedition. In addition, Crowe is implanted into the ground by use of an auger device and hence would be difficult to move from one spot to another.

It is an object of this invention to provide a highly mobile and lightweight deer decoy.

It is another object of this invention to provide a highly mobile deer decoy that includes a detachable and movable head operated by a remote control device.

It is a still further the object of this invention to provide a highly mobile deer decoy with motorized movements of the head and neck, which also includes a mechanism for simulating the bleating sound of a deer.

Other and further objects of this invention will become apparent upon reading the below described specifications and description.

BRIEF DESCRIPTION OF THE INVENTION

A highly portable motorized deer decoy is presented. The deer decoy utilizes a first servomotor to rotate the head and neck of the decoy a discreet distance from 1 degree to approximately 125 degrees, simulating the movement of the head and neck of a live deer. The decoy also has a second servomotor that enables the hunter to simulate the bleating of a deer in the woods. Both the movement of the deer's head and the operation of the bleating device may be remotely controlled by a hand-held remotely controlled signaling device. The head portion of the deer is completely detachable from the body as are the legs.

A lower plate is attached to the deer torso near the front breast. An upper plate is attached to the head of the deer. A middle drive plate is on top of the lower plate and under the upper plate. The upper plate is detachably connected to the middle plate. The middle plate is driven by a first motor, attached to the lower plate, and rotates the upper plate and deer head. The detachability of the head and legs provide a compact and highly mobile deer decoy that may be readily assembled and operated. In addition, the decoy may be readily deployed from place to place by simply moving the decoy as desired.

DETAILED DESCRIPTION OF THE DEVICE

Figure 1:
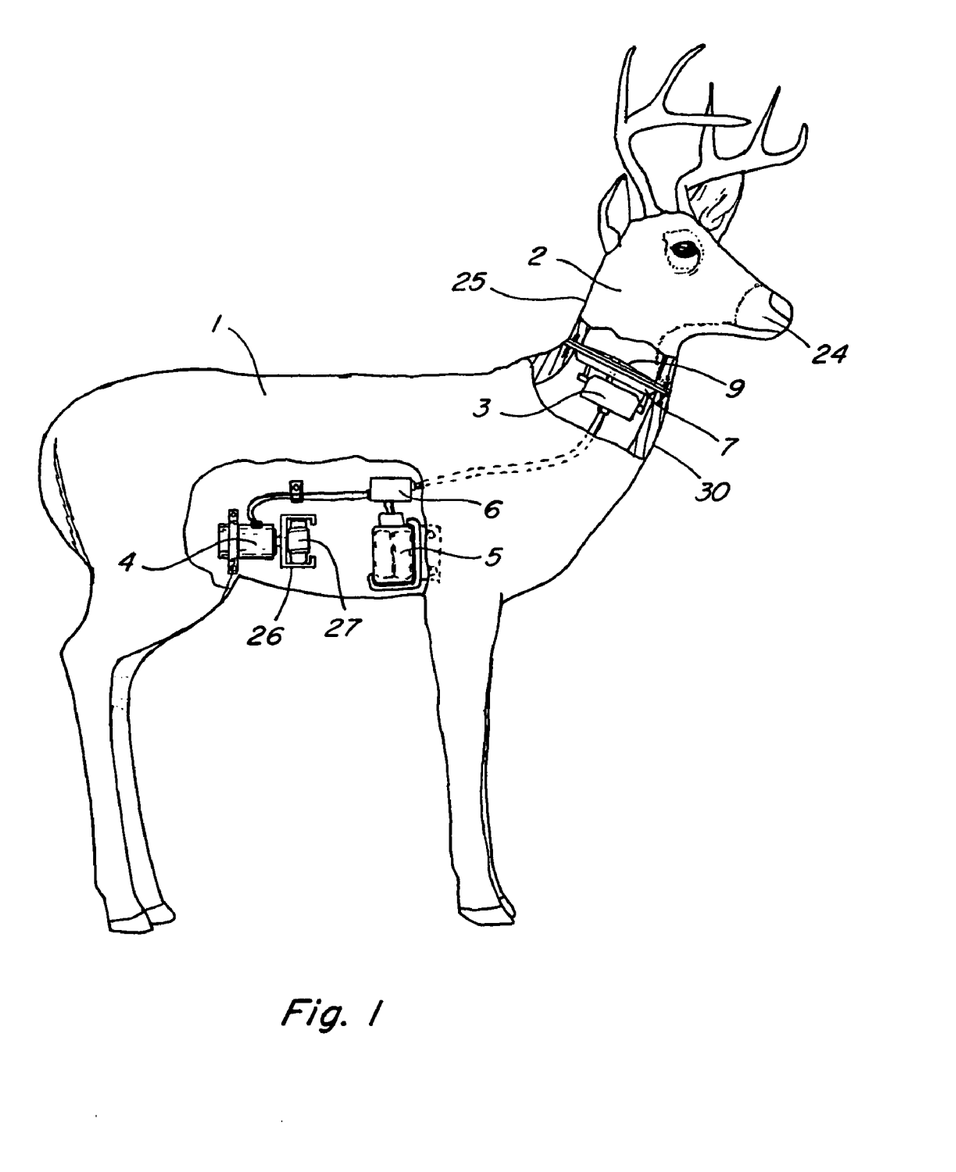
FIG. 1 is a side perspective cutaway view of the deer decoy showing the motorized portions of the decoy.

A three dimensional deer decoy having a detachable and movable head is shown in perspective view in FIG. 1. The deer decoy has generally a body 1 shaped in the form of a deer. The body comprises a torso having a tail and four legs. Attached to the front breast 30 of the torso is a neck and head. The deer decoy in the present embodiment has a movable head 2 that may be rotated a discreet distance from 1 degree to approximately 125 degrees by a remotely controlled first servomotor 3. The remote control has a switch that allows the operator to rotate the head a small amount (1 degree) to the full rotation (approximately 125 degrees). The remote is similar to remotes currently well known in the art.

In addition to the head movement, the bleating sound of a deer is also an important element of this device. A standard mechanism for producing the bleat of a deer is shown in FIG. 1. These mechanisms simulate a deer's sound. Primos™ manufacture one such commonly used device. When the deer-bleating mechanism is turned upside down (rotated 180 degrees), the mechanism produces a bleating sound. The bleating mechanism will be described later.

A direct current battery 5 drives the movement of the deer decoy of the present invention. The servomotors (3 for the head and 4 for the bleating sound) may be remotely controlled by a hand-held remote control similar to that found and used for radio controlled toy cars. The remote control sends a signal to the receiver 6 and allows the hunter to move the head as he desires. This remote controls the motion of the two motors (3 and 4).

Figure 2:
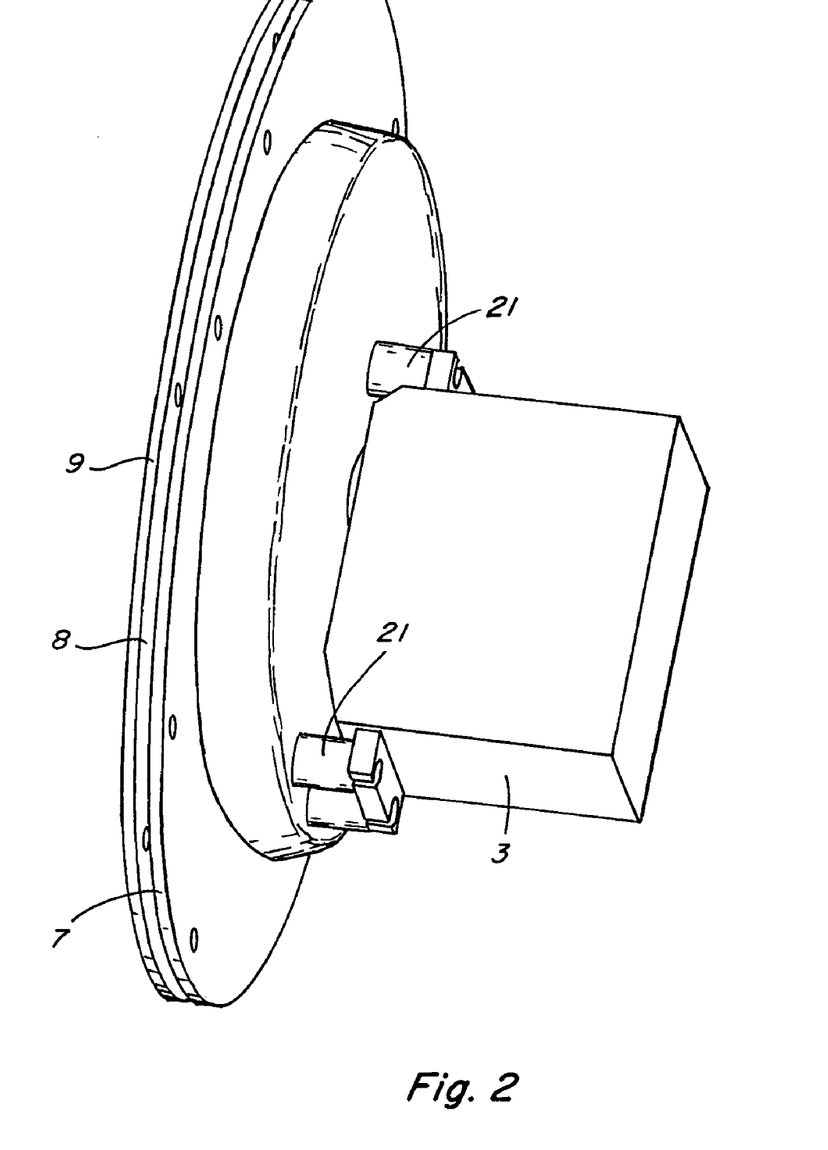
FIG. 2 is a perspective view of the first servomotor, used to rotate the neck and head of the deer, as well as the attaching and rotating plates.

Turning now to FIG. 2, the lower head motor 3 attaching mechanism is shown. A lower body attaching plate 7 is attached to the lower portion of the neck area, as best shown in FIG. 3A. This lower attaching plate 7 is stationary and permanently affixed to the lower portion of the deer's neck as shown in drawing FIGS. 1, and 3 and 3A.

Directly above the lower stationary attaching plate 7 is a middle rotating drive plate 8. Permanently attached to the upper head 2 of the decoy is an upper head attaching plate 9. These three plates are shown in exploded view in FIG. 4.

Figure 4:
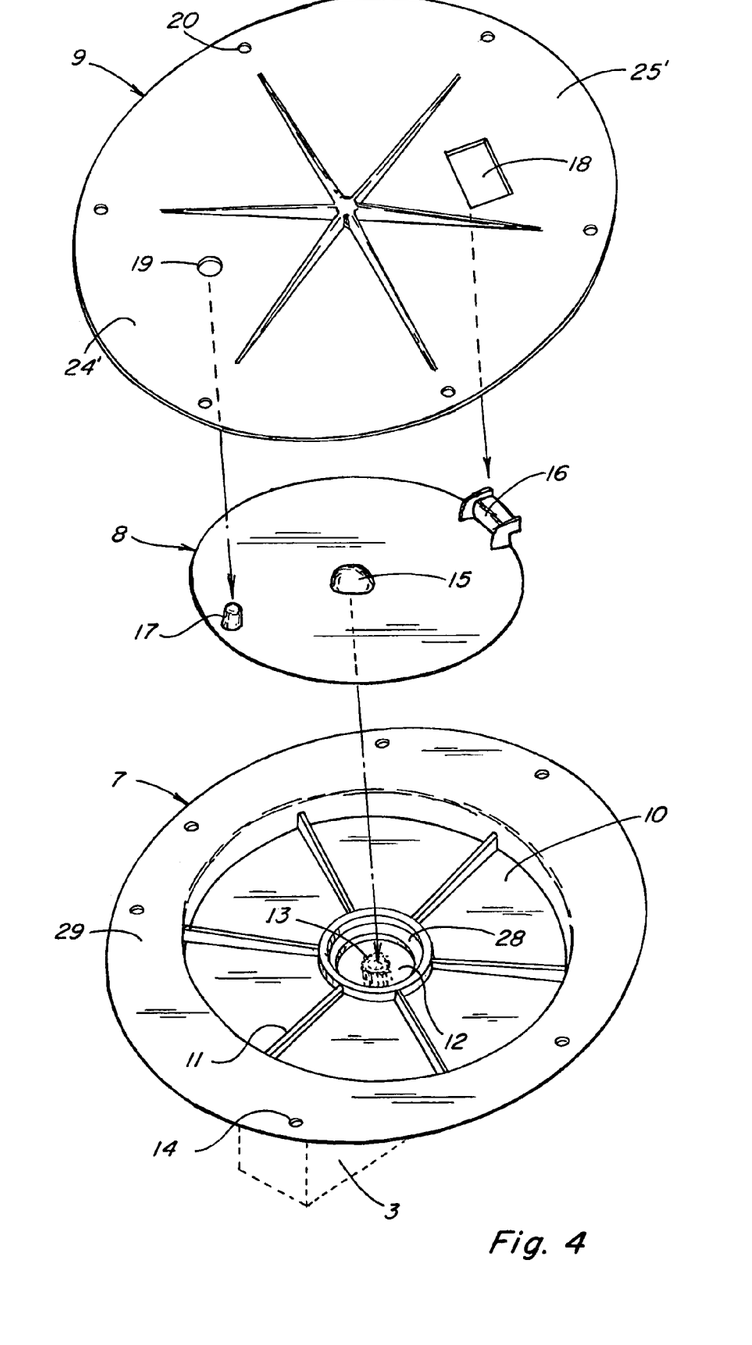
FIG. 4 is a perspective exploded view of the 3 plates comprising the main attaching and rotating mechanism for the deer head.

The lower body attaching plate 7, as shown in FIG. 4, has a lower, reinforced, cylindrical cavity 10 located inside its outer perimeter. This inner cylindrical cavity 10 has a circular cross section and circumference and is reinforced with a plurality of reinforcing ridges 11. The cylindrical cavity 10 also has a center inner aperture 12. This inner aperture 12 is designed to accept the drive shaft 13 of head motor 3. In addition, a ball bearing ring 28 is located around the inner aperture 12 as shown to facilitate the smooth rotation of the head 2 when the motor 3 is activated. The drive shaft 13 of the motor 3 is splined. The drive shaft 13 has a male, splined drive shaft adapted to fit inside the female splined cylinder of the middle rotating drive plate 8.

The entire lower body attaching plate 7 is permanently and fixedly secured to the lower neck portion of the deer decoy by the use of screws that are inserted through the attaching body screw holes 14.

As shown in FIG. 4, a middle rotating drive plate 8 is located between the upper and lower plates. This middle rotating drive plate 8 is shown in detail in FIGS. 7 and 8. The middle rotating drive plate 8 includes a lower female splined drive shaft receiving piece 15. Located on the upper surface of the middle plate 8 are a middle rotating drive piece attaching lip 16 and a middle rotating drive piece attaching nipple 17. The lip 16 and nipple 17 allow the head 2 to be easily removed from the body as will be described later.

Figure 9:
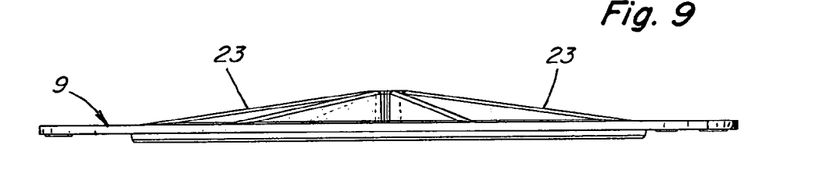
FIG. 9 is a side view of the upper head attaching plate.
Figure 10:
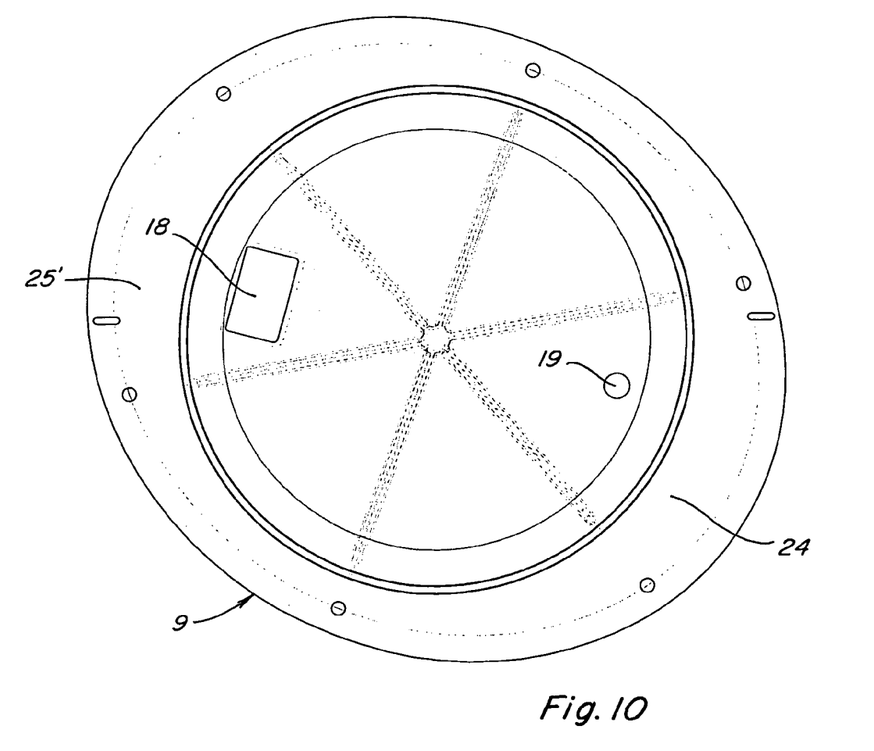
FIG. 10 is a top plan view of the upper head attaching plate.

The upper head attaching plate 9 is best shown on FIGS. 4, 9 and 10. As shown on FIG. 4, the upper head attaching plate 9 includes a lip-receiving slot 18 and a nipple-receiving aperture 19. The upper head 2 of the deer decoy is permanently affixed to the upper head attaching plate 9 by screws that are inserted through head attaching screw holes 20.

Figure 3:
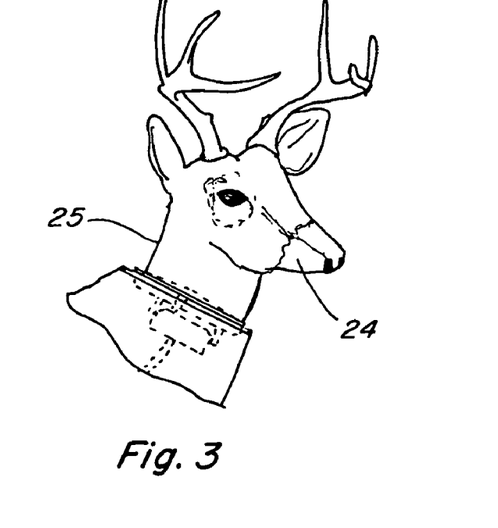
FIG. 3 is a side perspective view of the deer shown as a profile.
Figure 3A:
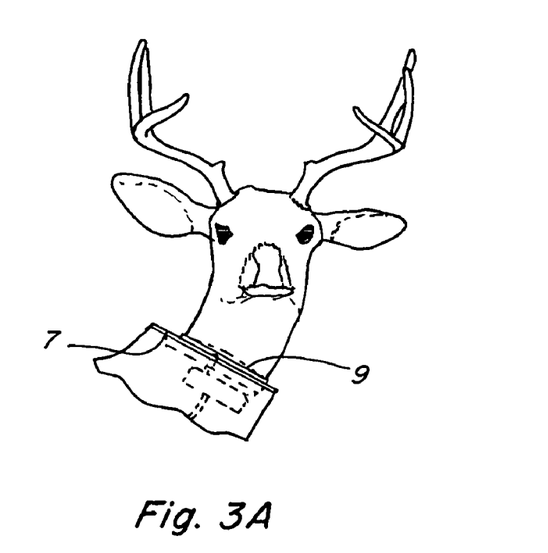
FIG. 3A is a side perspective view of the deer rotated approximately 90 degrees towards the viewer.

As best shown on FIGS. 3, 4, and 1, the upper head 2 of the deer is slanted slightly forward. The nose portion 24 of the deer head is attached near the front portion 24' of the upper attaching plate 9. The lip-receiving slot 18 is located near the rear portion 25 of the deer head. This rear portion 25 of the deer head corresponds and is attached to the rear portion 25' of the upper head attaching plate 9.

Figure 5:
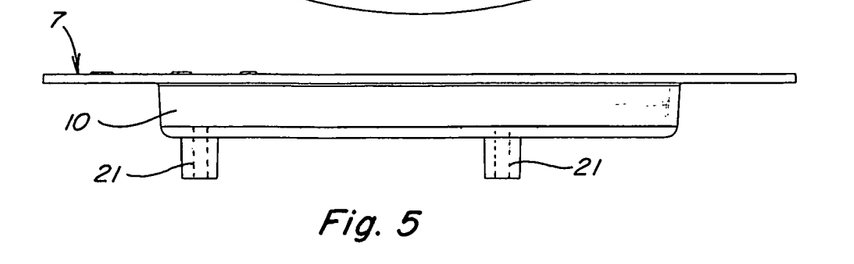
FIG. 5 is a side view of the lower body attaching plate without the motor attached.

As shown on FIG. 5, the lower body attaching plate 7 has a lower reinforced cylindrical cavity 10. Attached beneath this cylindrical cavity 10 are head motor attaching studs 21. The head motor 3 is attached to the lower body attaching plate 7 using the studs and screws. The head motor drive shaft 13 protrudes upwardly through the center of the lower body plate 7 as previously described. The motor (3) is attached to the lower attaching plate (7) by means of screws at stud 21.

Figure 6:
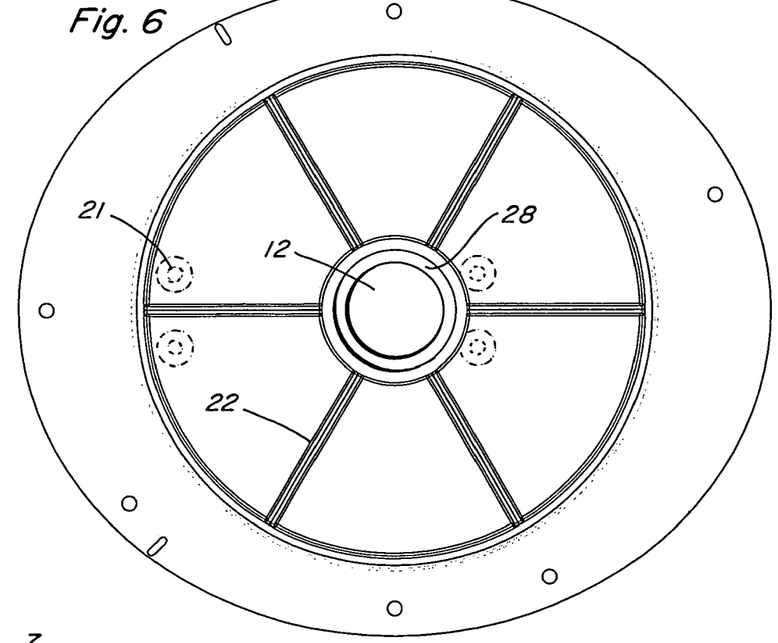
FIG. 6 is a top plan view of the lower body attaching plate.

As best shown on FIG. 6, the lower plate cylindrical cavity 10 has a number of reinforcing ridges 22 that are added for strength. These reinforcing ridges 22 are present in the preferred embodiment. However, the lower cylindrical cavity 10 may be reinforced in different ways or may be of such thickness and strength that the reinforcing ridges 22 are unnecessary. The ridges are shown to illustrate the preferred embodiment and are not meant as a means of limitation on the disclosure of this invention.

Figure 7:
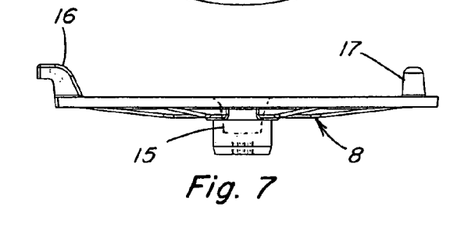
FIG. 7 is a side view of the middle rotating drive plate.
Figure 8:
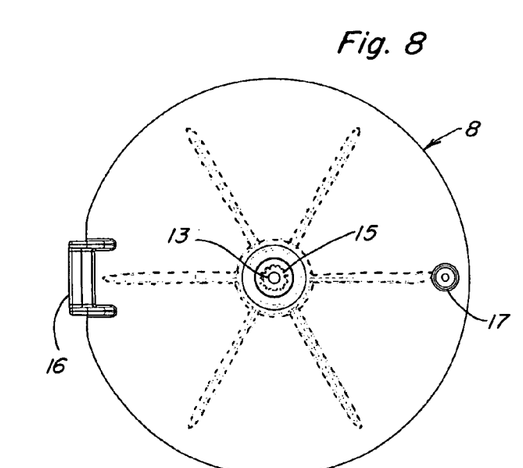
FIG. 8 is a top plan view of the middle rotating drive plate.

Turning now to FIGS. 7 and 8, the middle rotating drive plate 8 is shown. This drive plate 8 has a lower, female splined piece 15 and an upper lip 16 and nipple 17. The male splined drive shaft 13 is adapted to be received by the middle plate female splined piece 15. Once the drive shaft 13 and female splined piece 15 are secured together the head motor 3 is able to rotate the middle rotating drive plate 8.

The upper head attaching plate 9 is shown in detail in FIGS. 9 and 10. In FIG. 9, the headpiece reinforcing ridges 23 are shown. These ridges face upwardly and towards the eye and nose of the deer head shown in FIG. 1. Again, these reinforcing ridges are meant as a means of illustration of the preferred embodiment only and not as a limitation on this invention.

The lower body attaching plate 7 and upper head attaching plate 9 have a generally oval shape as best shown in FIGS. 6 and 10. The oval shape is in the shape of the deer decoy's neck. The oval shape faces towards the front or nose 24 of the deer. The rear portion of the oval 25' faces towards the back of the neck of the deer.

The upper head attaching plate 9 makes the deer head 2 readily and quickly detachable from the deer decoy body. The head portion of the deer decoy, connected to the upper head attaching plate 9, is simply slipped over the middle rotating drive plate lip 8 when attaching the deer head to the body. The rotating drive piece-attaching nipple 9 is then inserted into the receiving slot 19 of the upper head attaching plate 9. Since the head and antlers lean forward, the lip and nipple secure the head in place as the head is rotated.

Figure 11:
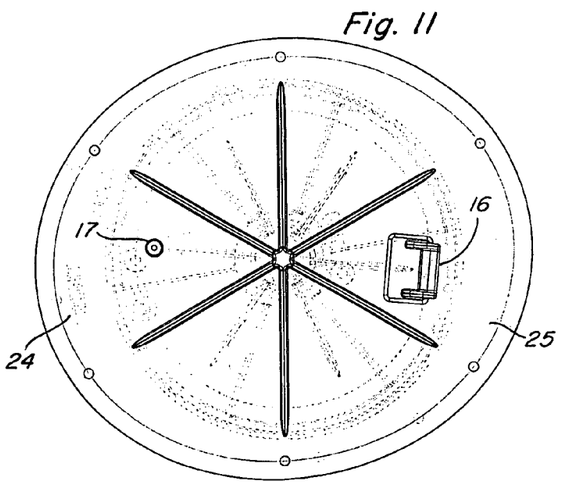
FIG. 11 is top view of the upper head attaching plate connected to the middle rotating drive plate.

The upper head attaching plate 9 is shown attached to the middle rotating drive plate 8 in FIG. 11. Although the head is not shown in FIG. 11, the connection of the middle and upper plates is shown.

Figure 12:
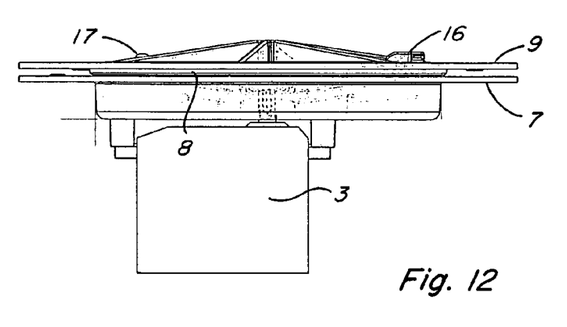
FIG. 12 is a side view of the head and neck turning mechanism showing the motor, upper and lower plates and the middle rotating drive plate as they are positioned to move the deer head.

Turning to FIG. 12, although the head is removed as in FIG. 11, the connection of the lower, middle and upper plates is shown. As shown in FIG. 12, the lower motor 3 is attached to the lower body attaching plate 7 by utilizing the attaching studs 21. The drive shaft 13 of head motor 3 is splined into the female receiving piece 15 of the middle rotating drive plate 8.

The inner cylindrical cavity 10, located in lower body attaching plate 7, is circular, as best shown in FIG. 4. The middle rotating drive plate 8 is also circular (see FIG. 4) and fits within the cylindrical cavity 10 such that the middle rotating plate 8 and the upper outer surface 29 of the lower body attaching plate 7 are flush with each other.

The head can be attached to the body of the deer decoy using the attaching piece plate 9. The head is attached to the middle rotating drive plate 8 using the lip and nipple as described before.

When motor 3 is activated, the deer decoy head will turn approximately 125 degrees as best shown in FIGS. 3 and 3A. In order to facilitate the smooth rotation and movement of the head, a ball bearing ring 28, may also be located within the inner aperture 12 of the lower body attaching plate 7.

As an added feature of this device, a second servomotor 4, located in front of the rear leg as shown on FIG. 1, operates a bleating mechanism. This bleating mechanism includes a standard bleater 27, which is attached to the drive shaft of the bleater motor 4 by any convenient mechanism.

This mechanism could include simply Velcro® hook and pile fasteners or a generally "c" shaped bleating bracket 26 as shown in the drawing figures. The bleating mechanism may be conveniently removed from the decoy during transportation of the decoy to eliminate the sound from being heard as the decoy is moved.

The signal receiver 6 can receive two discreet signals from a remotely operated transmitter. A first signal would turn the head 2 a discreet amount, from 1 degree to approximately 125 degrees. A second signal would turn the bleater 27 approximately 180 degrees, thus creating the simulated bleating noise of a deer.

As described above, a deer decoy with a detachable head is provided which is easily transportable and deployable. Since the legs of the device are also removable, the body, legs, and head, as well as the internally placed mechanisms described form a compact and highly transportable deer decoy. The entire device can be transported in a small duffel bag or other carrier. The mechanism described can be easily and quickly retrofitted into existing off-the-shelf decoys, such as that manufactured by Flambeau™. Since the three plates are closely connected and essentially flat, the spaces between the plates are minimized. This eliminates any gap that might appear in other designs.

I claim:

1. A deer decoy having a movable and detachable head, comprising:
   (a) a three-dimensional deer body having legs attached to a torso, said body including a front breast, a head and a neck;
   (b) a lower plate attached near the front breast of said torso, said lower plate having an inner aperture;
   (c) a middle rotating plate having an upper lip and nipple and a female drive shaft receiving piece;
   (d) an upper plate attached to the head of said decoy having a lip receiving slot and a nipple receiving slot adapted to receive the lip and nipple of said middle rotating plate;
   (e) a motor attached to said lower plate having a splined drive shaft inserted through the inner aperture of said lower plate and into said middle plate female receiving piece;
   wherein said head may be detachably connected to said body and rotated a discreet distance by said motor.

2. A deer decoy having a movable and detachable head, comprising:
   (a) a three-dimensional deer body having legs attached to a torso, said body including a front breast, a head and a neck;
   (b) a lower plate attached near the front breast of said torso, said lower plate having an inner aperture;
   (c) a middle rotating plate having an upper lip and nipple and a female drive shaft receiving piece;
   (d) an upper plate attached to the head of said decoy having a lip receiving slot and a nipple receiving slot adapted to receive the lip and nipple of said middle rotating plate;
   (e) a first motor attached to said lower plate having a splined drive shaft inserted through the inner aperture of said lower plate and into said middle plate female receiving piece;
   (f) a second motor attached inside and near the back legs of said body;
   (g) a bleating mechanism attached to a second motor;
   wherein said head may be detachably connected to said body and rotated a discreet distance by said first motor and wherein said second motor rotates said bleating mechanism to make a simulated deer sound.

* * * * *